United States Patent
Kamali

(10) Patent No.: US 11,897,780 B2
(45) Date of Patent: Feb. 13, 2024

(54) ELECTROCHEMICAL METHOD FOR HIGH-TEMPERATURE MOLTEN SALT ELECTROLYSIS IN HUMID ATMOSPHERE

(71) Applicant: NORTHEASTERN UNIVERSITY, Liaoning (CN)

(72) Inventor: Ali Reza Kamali, Liaoning (CN)

(73) Assignee: NORTHEASTERN UNIVERSITY, Liaoning (CN)

( * ) Notice: Subject to any disclaimer, the term of this patent is extended or adjusted under 35 U.S.C. 154(b) by 782 days.

(21) Appl. No.: 17/040,895

(22) PCT Filed: Jul. 9, 2019

(86) PCT No.: PCT/CN2019/095228
§ 371 (c)(1),
(2) Date: Sep. 23, 2020

(87) PCT Pub. No.: WO2020/011155
PCT Pub. Date: Jan. 16, 2020

(65) Prior Publication Data
US 2021/0009415 A1    Jan. 14, 2021

(30) Foreign Application Priority Data
Jul. 10, 2018  (CN) .......................... 201810748672.9

(51) Int. Cl.
*C01B 6/26*    (2006.01)
*C01B 13/14*   (2006.01)
(Continued)

(52) U.S. Cl.
CPC ............... *C01B 6/26* (2013.01); *C01B 13/14* (2013.01); *C25C 5/04* (2013.01); *C25C 7/005* (2013.01)

(58) Field of Classification Search
CPC .......... C01B 6/26; C01B 13/14; C25C 7/005; C25C 5/04
See application file for complete search history.

(56) References Cited

U.S. PATENT DOCUMENTS

| 4,274,938 A | 6/1981 | Schulten et al. |
| 7,776,201 B1 | 8/2010 | Vajo et al. |
| (Continued) | | |

FOREIGN PATENT DOCUMENTS

| CN | 106414323 A | 2/2017 |
| JP | S54-62194 A | 5/1979 |

OTHER PUBLICATIONS

Divisek, J. et al., "Production of Hydrogen by the Electrolytic Decomposition of Water in Fused Sodium Hydroxide," International Journal of Hydrogen Energy, Elsevier Science Publishers B.V., Barking, GB, vol. 5, Issue No. 2, Dec. 31, 1980, pp. 151-164 (XP-025578975).

*Primary Examiner* — Paul A Wartalowicz
(74) *Attorney, Agent, or Firm* — MUNCY, GEISSLER, OLDS & LOWE, P.C.

(57) ABSTRACT

Disclosed is an electrochemical method for high-temperature molten salt electrolysis in humid atmosphere. The method involves preparing hydrogen gas, metals/alloys, metal oxide compounds and metal hydrides in humid high-temperature molten salt environment. Hydrogen gas is generated by electrolyzing water in a molten salt electrolyte at above 100° C., and with a working cathode being a solid-state oxide pellet and a voltage applied to the electrolyzing cell being far lower than that in a direct electro-deoxidation process, the hydrogen gas generated reduces solid-state oxide cathodes to produce metals. The hydrogen ions in the molten salt can be prepared by hydrolysis reaction of the molten salt in a water vapor containing atmosphere. Corresponding metals or alloys or metal oxide compounds can be (Continued)

prepared by reducing iron oxide, molybdenum oxide, tantalum oxide, nickel oxide, copper oxide, titanium oxide or corresponding compound oxides and the like.

24 Claims, 7 Drawing Sheets

(51) Int. Cl.
*C25C 5/04* (2006.01)
*C25C 7/00* (2006.01)

(56) References Cited

U.S. PATENT DOCUMENTS

| | | | |
|---|---|---|---|
| 2007/0131560 A1* | 6/2007 | Ratchev | C25C 5/04 205/560 |
| 2007/0295609 A1* | 12/2007 | Jeong | C25C 3/02 205/371 |
| 2013/0115535 A1* | 5/2013 | Delfino | H01M 8/04208 429/422 |

* cited by examiner

ELECTROCHEMICAL METHOD FOR HIGH-TEMPERATURE MOLTEN SALT ELECTROLYSIS IN HUMID ATMOSPHERE

TECHNICAL FIELD

The invention belongs to the technical field of electrochemical metallurgy and relates to an electrochemical method for high-temperature molten salt electrolysis in humid atmosphere.

BACKGROUND

It is known that high-temperature electrolysis requires less electrical energy, but higher thermal energy. Since thermal energy is less expensive, electrolysis processes are favored at high temperatures. From the thermodynamic point of view, the energy required for an electrolysis reaction can be described by the equation (1):

$$\Delta H = \Delta F + T\Delta S \quad (1)$$

In the equation (1), $\Delta H$ is the enthalpy change corresponding to the total energy required for the electrolysis process, and $\Delta S$ is the associated entropy change. $T\Delta S$ and $\Delta F$ are the thermal energy, and electrical energy required for the electrolysis, respectively.

Hydrogen can be produced by electrolyzing water at different temperatures. The theoretical decomposition voltages required for the electrolysis of water at 25° C., 100° C. and 700° C. can be considered to be as follows:

$$2H_2O\ (l) = 2H_2\ (g) + O_2\ (g) \quad (2)$$

$E° = -1.23$ V at 25° C.

$E° = -1.17$ V at 100° C.

$E° = -0.77$ V at 700° C.

As shown above, by increasing the temperature, the voltage required for the electrolytic decomposition of water decreases. Therefore, for electrolysis of water, it is beneficial to partially replace the electrical energy with thermal energy since the latter is more economic.

In addition, clean solar and nuclear energy can also be used to provide thermal energy required in high-temperature electrolysis processes, further enhancing the efficiency and economy of the process. However, the water electrolysis temperature is limited to lower temperatures due to the boiling point of the water (100° C.).

At present, the industrial primary production of metals is mainly based on carbothermal or metallothermic reduction of the corresponding minerals (mainly oxide ores). The major disadvantages of this kind of high-temperature metallurgical processes lie in the fact that large amounts of $CO_2$ greenhouse gas are produced, while facing the challenge associated with shortage of reducing agent resources. Therefore, an increasing number of scientists and technologists have focused on developing new green metallurgical processes with reduced or no $CO_2$ emissions. Replacing the carbon or metallic reducing agents with hydrogen, provides distinct advantages because of the following reasons: a) hydrogen is the most abundant element in the universe, b) the reaction between hydrogen and the oxide precursor produces water as the by-product, without producing $CO_2$ emissions or environmental side effects, c) since hydrogen has theoretically a higher value of energy density compared to carbon and metallic reductants, lower amounts of hydrogen is required for the reduction process. In addition, hydrogen plasma is considered a very powerful reducing agent, which is capable of reducing almost all metals at temperatures below the melting point of the corresponding metals.

SUMMARY

In view of the shortcomings of the prior art, the present invention provides an electrochemical method in a high-temperature molten salt environment in humid atmosphere, in order to: a) the electrolytic preparation of hydrogen in a high-temperature molten salt in humid atmosphere; b) the reduction of metal oxides such as iron oxide, molybdenum oxide, tantalum oxide, nickel oxide, copper oxide, titanium oxide or corresponding mixed oxides by the hydrogen in-situ generated by the electrolytic process to prepare the corresponding metals or alloys; c) the in-situ reduction of metal oxides such as iron oxide, molybdenum oxide, tantalum oxide, nickel oxide, copper oxide, titanium oxide, or corresponding mixed oxides, by the hydrogen in-situ generated by the electrolytic process to prepare metal oxide compounds; d) hydrogenating of metallic cathodes by the hydrogen produced by molten salt electrolysis to prepare the corresponding metal hydrides. The method provides a novel, green and effective metallurgical process with low energy consumption.

The invention relates to a method of preparing hydrogen gas by electrolysis of high-temperature molten salts in a moist atmosphere, and in particular, to preparing hydrogen gas by the electrolysis of molten salts; wherein the temperature of molten salt is 150 to 1000° C., and the water vapor content in the atmosphere of molten salt is 0.1 to 100 Vol. %. The molten salt electrolyte is one or a mixture of more components of alkali metal halides and/or alkaline earth metal halides.

In the method of preparing hydrogen by high-temperature molten salt electrolysis in humid atmosphere, the molten salt electrolyte is one or more of LiF, LiCl, LiBr, LiI, NaF, NaCl, NaBr, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaF_2$, and $ZnCl_2$.

In the method of preparing hydrogen by high-temperature molten salt electrolysis in humid atmosphere, the molten salt electrolyte is LiCl.

In the method of preparing hydrogen by high-temperature molten salt electrolysis in humid atmosphere, during the molten salt electrolysis, the molten salt electrolyte contains HCl, HF or HI.

In the method of preparing hydrogen by high-temperature molten salt electrolysis in humid atmosphere, hydrogen ions in the molten salt electrolyte originate from a hydrolysis reaction of the molten salt in the humid atmosphere.

In the method of preparing hydrogen by high-temperature molten salt electrolysis in humid atmosphere, water vapour is brought into the molten salt electrolysis reactor at a temperature of ≥100° C.

In the method of preparing hydrogen by high-temperature molten salt electrolysis in humid atmosphere, the cathode is an iron rod, a tungsten mesh, a nickel mesh, or a $LiTiO_2$ ceramic material.

In the method of preparing hydrogen by high-temperature molten salt electrolysis in humid atmosphere, the temperature of the molten salt is greater than or equal to the melting temperature of the molten salt+1° C.

In the method of preparing hydrogen by high-temperature molten salt electrolysis in humid atmosphere, the heating rate of the molten salt is 0.1 to 100° C./min.

In the method of preparing hydrogen by high-temperature molten salt electrolysis in humid atmosphere, the voltage of molten salt electrolysis is 0.7 to 3V.

In the above-mentioned method of preparing hydrogen by high-temperature molten salt electrolysis in a humid atmosphere, a new method for preparing hydrogen by electrolyzing water in high-temperature molten salt electrolytes is provided. At high temperatures, the molten salt electrolyte undergoes a hydrolysis reaction, leading to the generation of dissolved hydrogen ions. Under the influence of a cathode polarization potential, the hydrogen ions undergo a discharge reaction at the cathode to generate hydrogen atoms and hydrogen molecules. For example, LiCl can generate hydrogen ions at a temperature higher than its melting point of 605° C. For example, in order to generate hydrogen by electrolysis in LiCl molten salt at 700° C., in theory, a voltage of more than 0.77V needs to be applied between the working cathode and the anode.

Hydrogen can be produced electrolytically in a high-temperature molten salt. HCl gas can be dissolved into molten salts, and the dissolved HCl is dissociated into hydrogen ions and chloride ions. Under a cathodic polarization potential, hydrogen ions are discharged to generate hydrogen. The reaction is shown as the equation (3):

$$2HCl = H_2(g) + Cl_2(g) \tag{3}$$

$\Delta G° = 201$ kJ $E° = -1.04$ V 25° C.

$\Delta G° = 191$ kJ $E° = -0.99$ V 700° C.

A method of preparing metals/alloys by high-temperature molten salt electrolysis in humid atmosphere, with the specification that: in humid molten salt electrolysis environment, a solid metal oxide used as the cathode is reduced in situ by the hydrogen generated by electrolysis in the molten salt, the oxide is used as the working cathode to prepare the corresponding metal/alloy, the temperature of the molten salt is 150 to 1000° C., the water vapor content of the molten salt protective atmosphere is 0.1 to 100 Vol. %, and the molten salt electrolyte is one or a mixture of more components of alkali metal halides and/or alkaline earth metal halides.

In the method of preparing metals/alloys by high-temperature molten salt electrolysis in humid atmosphere, the metal oxide is the working cathode.

In the method of preparing metals/alloys by high-temperature molten salt electrolysis in humid atmosphere, the metal oxide is placed in a molten salt electrolyte, the molten salt electrolyte dissolves hydrogen ions, and has a temperature is 150 to 1000° C.

In the method of preparing metals/alloys by high-temperature molten salt electrolysis in humid atmosphere, the molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaF_2$, and $ZnCl_2$.

In the method of preparing metals/alloys by high-temperature molten salt electrolysis in humid atmosphere, the molten salt electrolyte is LiCl. The electrolytic product is $Li_2Fe_3O_5$. The electrolytic product $Li_2Fe_3O_5$ is in the form of uniform octahedral particles with a size of 0.2 to 10 μm.

In the method of preparing metals/alloys by high-temperature molten salt electrolysis in humid atmosphere, the metal oxide with a theoretical decomposition voltage≤1.2V is one or a mixture containing at least one of: $MoO_3$, $WO_3$, PbO, CuO, ZnO, $SnO_2$, $V_2O_3$, $Cr_2O_3$, CoO, NiO or $Mn_2O_3$, for which the corresponding molten salt electrolysis voltage≤2V.

In the method of preparing metals/alloys by high-temperature molten salt electrolysis in humid atmosphere, the metal oxide with a theoretical decomposition voltage≤2V is one or a mixture containing at least one of $TiO_2$, $ZrO_2$, $UO_2$, $SiO_2$ or $Nb_2O_5$, for which the corresponding molten salt electrolysis voltage≤3V.

In the method of preparing metals/alloys by high-temperature molten salt electrolysis in humid atmosphere, the metal oxide is $Fe_2O_3$, the voltage is 1V and the electrolytic product is metallic iron.

In the method of preparing metals/alloys by high-temperature molten salt electrolysis in humid atmosphere, the molten salt electrolyte during the molten salt electrolysis process contains HCl, HF or HI.

In the method of preparing metals/alloys by high-temperature molten salt electrolysis in humid atmosphere, the hydrogen ions in the molten salt electrolyte are derived from the hydrolysis reaction of the molten salt in the humid atmosphere.

In the method of preparing metals/alloys by high-temperature molten salt electrolysis in humid atmosphere, water vapor is brought into the molten salt electrolytic reactor at a temperature≥100° C.

In the method of preparing metals/alloys by high-temperature molten salt electrolysis in humid atmosphere, the temperature of the molten salt is greater than or equal to the melting temperature of the salt+1° C.

In the method of preparing metals/alloys by high-temperature molten salt electrolysis in humid atmosphere, the heating rate of molten salt is 0.1 to 100° C./min.

In the method of preparing metals/alloys by high-temperature molten salt electrolysis in humid atmosphere, the voltage of molten salt electrolysis is 0.7 to 3V.

In the above-mentioned method of high-temperature molten salt electrolytic preparation of metals/alloys in humid atmosphere, metals are produced by the reduction of metal oxide cathodes; where hydrogen produced by the electrolysis of molten salt in situ reduces the solid metal oxides to corresponding metals or alloys. Hydrogen as a strong reducing agent provides the thermodynamic and kinetic driving force for the reduction process.

For example, in the case of hydrogen reduction of iron oxide ($Fe_2O_3$), the reduction reaction reaches to its equilibrium at 510° C.:

| | | |
|---|---|---|
| $Fe_2O_3 + 3H_2$ (g) = 2Fe + $3H_2O$ (g) | | (4) |
| $\Delta G° = 55.3$ kJ | 25° C. | |
| $\Delta G° \approx 0$ kJ | 510° C. | |
| $\Delta G° = -16.7$ kJ | 700° C. | |

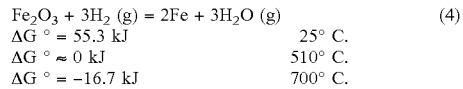

Therefore, the electrolysis of water in high-temperature molten salts in humid (containing water vapor) atmosphere generates hydrogen at the cathode, when for example, a theoretical decomposition voltage of more than 0.77 V is applied at the temperature of 700° C.; and the cathodic-generated hydrogen in situ reduces solid metal oxides without requirement of providing any additional energy, since the Gibbs' free energy of the reduction reaction at 700° C. becomes negative at −17 kJ/mol. In addition, since the hydrogen reduction reaction is exothermic, the energy released during the reduction process can be used to supplement the energy lost during the high-temperature process, maintaining the reaction temperature of the electrolytic cell.

Theoretical calculations show that a large number of metal oxides can be reduced to corresponding metals at 700° C., such as the reactions shown below.

| | | | |
|---|---|---|---|
| $MoO_3 + 3H_2(g) = Mo + 3H_2O(g)$ | $\Delta G° = -83$ kJ | $E° = -0.017$ V | (5) |
| $WO_3 + 3H_2(g) = W + 3H_2O(g)$ | $\Delta G° = 9.68$ kJ | $E° = -0.017$ V | (6) |
| $PbO + H_2(g) = Pb + H_2O(g)$ | $\Delta G° = -72.35$ kJ | $E° = -0.37$ V | (7) |
| $CuO + H_2(g) = Cu + H_2O(g)$ | $\Delta G° = -125.7$ kJ | $E° = -0.65$ V | (8) |
| $ZnO + H_2(g) = Zn + H_2O(g)$ | $\Delta G° = 56.36$ kJ | $E° = -0.29$ V | (9) |
| $SnO_2 + 2H_2(g) = Sn + 2H_2O(g)$ | $\Delta G° = -9.12$ kJ | $E° = -0.02$ V | (10) |
| $V_2O_3 + 3H_2(g) = 2V + 3H_2O(g)$ | $\Delta G° = -381.3$ kJ | $E° = -0.66$ V | (11) |
| $Cr_2O_3 + 3H_2(g) = 2Cr + 3H_2O(g)$ | $\Delta G° = -295.46$ kJ | $E° = -0.51$ V | (12) |
| $CoO + H_2(g) = Co + H_2O(g)$ | $\Delta G° = -28.816$ kJ | $E° = -0.15$ V | (13) |
| $NiO + H_2(g) = Ni + H_2O(g)$ | $\Delta G° = -43.3$ kJ | $E° = -0.224$ V | (14) |
| $Mn_2O_3 + 3H_2(g) = 2Mn + 3H_2O(g)$ | $\Delta G° = 125$ kJ | $E° = -0.22$ V | (15) |

In a humid atmosphere, high-temperature molten salts go through hydrolysis to produce hydrogen ions. For example, LiCl, CaCl, $MgCl_2$ and NaCl molten salts can be hydrolysed in an atmosphere containing 0.1 to 100 Vol. % water vapour to form HCl, and the resulting HCl gas can be dissolved in the high-temperature molten salts, and dissociated into hydrogen and chloride ions. For example, the hydrolysis reaction of LiCl can be shown as follows:

$$2LiCl + H_2O \rightarrow Li_2O + 2HCl 2Li^+ + O^{2-} + 2H^+ + 2Cl^- \quad (16)$$

In addition, the hydrolysis of high-temperature fluoride molten salts, such as LiF, $CaF_2$, $MgF_2$ and NaF, in an atmosphere containing 0.1 to 100 Vol. % water vapor, produces hydrogen fluoride, and the resulting hydrogen fluoride can be dissolved into the fluoride melt to generate hydrogen ions.

The mechanism involved in the electrochemical hydrogen reduction of metal oxides in high-temperature molten salts can be explained as follows:

The method of direct electrochemical reduction of solid oxides, known as the FFC-Cambridge process, is widely used to extract refractory metals, rare metals and semiconductor metals. The technical core of the FFC-Cambridge method is based on chloride or fluoride-based molten salt electrolytes, where solid oxide (or sulphide) powders are pressed and sintered to produce cathodes, while graphite (or inert materials) are used as anodes; a constant voltage electrolysis is applied at a temperature below the melting point of the metal, and potentials below the decomposition voltage of the molten salt electrolyte through which oxygen (or sulfur) from the cathodic compound gradually ionizes into oxygen ions (or sulfur ions) and dissolves into the molten salt, and then diffuses to the anode where the ions are discharged to generate gas under the influence of the polarization applied, leading to the reduction of cathodic metal oxides (or metal sulphides) into metals or alloys due to the deoxidation (or sulfur loss). The FFC Cambridge method is a solid phase electrolysis process for extracting metals directly from metal oxides (or metal sulphides) in solid form. The electrochemical reduction of solid oxides can be expressed as follows:

$$MO_2 = M + O_2 \quad (17)$$

The selected electrolyte for the FFC Cambridge process should meet the following conditions: (i) the decomposition voltage of the molten salt electrolyte should be greater than the decomposition voltage of the cathode oxide, i.e. the electrochemical window of the molten salt electrolyte should be wide enough; (ii) the electrolyte should have sufficient ability to dissolve oxygen ions. Typically, the theoretical decomposition voltage of $CaCl_2$ molten salt at 900° C. is about 3.2V, and the solubility of CaO at this temperature is about 20 mol. %, and therefore, $CaCl_2$ is widely used in the study of FFC-Cambridge process. For example, reactions occurring during the electro-deoxidation of $TiO_2$ in $CaCl_2$ molten salt media can be described as follow:

| | | | |
|---|---|---|---|
| $TiO_2 = Ti + O_2$ (g) | | | (18) |
| $\Delta G° = 767$ kJ | $E° = -1.99$ V | 700° C. | |
| $\Delta G° = 732$ kJ | $E° = -1.90$ V | 900° C. | |

Although the decomposition of $TiO_2$ at 900° C. theoretically requires a voltage of 1.9V, however, the voltage applied during the actual electrolysis process is about 3.1V, and the electrolysis time exceeds 10 h in order to achieve complete deoxidation.

Compared with the FFC Cambridge method, the method described in the present invention can significantly reduce the electrolysis voltage and the operating temperature, thus significantly reducing the energy consumption index. The method of this invention is not an "electro-deoxidation" process, but an "electrochemical hydrogen reduction" process. In comparison with the direct electro-deoxidation of $TiO_2$ (reaction (18)), the electrochemical hydrogen reduction of $TiO_2$ in the present invention is expressed as follows:

| | | | | |
|---|---|---|---|---|
| $TiO_2 + 2H_2$ (g) = Ti + $2H_2O$ (g) | $\Delta G° = 379$ kJ | $E° = -0.98$ V | 700° C. | (19) |

Therefore, the theoretical decomposition voltage required for the reaction (19) at 700° C. is 1 V which is lower than that of the reaction (18).

The theoretical reduction potential required for other metal oxides at 700° C. can further be calculated; for example:

| | | | |
|---|---|---|---|
| $UO_2 + 2H_2(g) = U + 2H_2O(g)$ | $\Delta G° = 528$ kJ | $E° = -1.37$ V | (20) |
| $ZrO_2 + 2H_2(g) = Zr + 2H_2O(g)$ | $\Delta G° = 526$ kJ | $E° = -1.36$ V | (21) |
| $Nb_2O_5 + 5H_2(g) = 2Nb + 5H_2O(g)$ | $\Delta G° = 503$ kJ | $E° = -1.04$ V | (22) |
| $SiO_2 + 2H_2(g) = Si + 2H_2O(g)$ | $\Delta G° = 346.59$ kJ | $E° = -0.9$ V | (23) |

A method of preparing metal oxide compounds by high-temperature molten salt electrolysis in humid atmosphere, specifically: in a humid molten salt electrolysis environment, the gas generated by the molten salt electrolysis in situ reduces the cathode solid metal oxides, and during the electrolysis, the metal oxides are used as working cathodes to prepare the corresponding metal oxide compounds; in which the temperature of the molten salt is 150 to 1000° C., the water vapor content of the molten salt protection atmosphere is 0.1 to 100 Vol. %, and the molten salt electrolyte is one or a mixture of more components of alkali metal halides and/or alkaline earth metal halides.

In the method of preparing metal oxide compounds by high-temperature molten salt electrolysis in humid atmosphere, the metal oxides are working cathodes and a certain cathodic polarization potential is applied.

In the method of preparing metal oxide compounds by high-temperature molten salt electrolysis in humid atmosphere, the metal oxides are placed in a molten salt electrolyte, the molten salt electrolyte dissolves hydrogen ions, and has a temperature is 150 to 1000° C.

In the method of preparing metal oxide compounds by high-temperature molten salt electrolysis in humid atmosphere, the molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaCl_2$, $BaF_2$ and $ZnCl_2$.

In the method of preparing metal oxide compounds by high-temperature molten salt electrolysis in humid atmosphere, the molten salt electrolyte is LiCl.

In the method of preparing metal oxide compounds for high-temperature molten salt electrolysis in humid atmosphere, during the molten salt electrolysis process, the molten salt electrolyte contains HCl, HF or HI In the method of preparing metal oxide compounds by high-temperature molten salt electrolysis in humid atmosphere, the metal oxide is one or a mixture containing at least one of: $MoO_3$, $WO_3$, PbO, CuO, ZnO, $SnO_2$, $V_2O_3$, $Cr_2O_3$, CoO, NiO, $Mn_2O_3$, $TiO_2$, $ZrO_2$, $UO_2$, $SiO_2$ or $Nb_2O_5$.

In the method of preparing metal oxide compounds by high-temperature molten salt electrolysis in humid atmosphere, the hydrogen ions in the molten salt electrolyte are derived from the hydrolysis reaction of the molten salt in the humid atmosphere.

In the method of preparing metal oxide compounds by high-temperature molten salt electrolysis in humid atmosphere, water vapor is brought into the molten salt electrolysis reactor at a temperature≥100° C.

In the method of preparing metal oxide compounds by high-temperature molten salt electrolysis in humid atmosphere, the temperature of the molten salt is greater than or equal to the melting temperature of the molten salt+1° C.

In the method of preparing metal oxide compounds by high-temperature molten salt electrolysis in humid atmosphere, the heating rate of the molten salt is 0.1 to 100° C./min.

In the method of preparing metal oxide compounds by high-temperature molten salt electrolysis in humid atmosphere, the voltage of molten salt electrolysis is 0.7 to 3V.

A method of preparing metal hydrides by high-temperature molten salt electrolysis in humid atmosphere, specifically: in a humid molten salt electrolysis environment, the hydrogen generated by the molten salt electrolysis hydrogenates a solid metal cathode. During the electrolysis process, the metal is used as the working cathode to prepare the corresponding metal hydride; where the temperature of the molten salt is 150 to 1000° C., the water vapor content of the molten salt protective atmosphere is 0.1 to 100 Vol. %, and the molten salt electrolyte is one or a mixture of more components of alkali metal halides and/or alkaline earth metal halides.

In the method of preparing metal hydrides by high-temperature molten salt electrolysis in humid atmosphere, the metals are working cathode, and a certain cathode polarization potential is applied.

In the method of preparing metal hydrides by high-temperature molten salt electrolysis in humid atmosphere, the metals are placed in a molten salt electrolyte, and the molten salt electrolyte dissolves hydrogen ions, and has a temperature of 150 to 1000° C.

In the method of preparing metal hydrides by high-temperature molten salt electrolysis in humid atmosphere, the molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaCl_2$, $BaF_2$ and $ZnCl_2$.

In the method of preparing metal hydrides by high-temperature molten salt electrolysis in humid atmosphere, the molten salt electrolyte is LiCl.

In the method of preparing metal hydrides by high-temperature molten salt electrolysis in humid atmosphere, during the molten salt electrolysis process, the molten salt electrolyte contains HCl, HF or HI In the method of preparing metal hydrides by high-temperature molten salt electrolysis in humid atmosphere, the hydrogen ions in the molten salt electrolyte are derived from the hydrolysis reaction of the molten salt in the humid atmosphere.

In the method of preparing metal hydrides by high-temperature molten salt electrolysis in humid atmosphere, water vapor is brought into the molten salt electrolysis reactor at a temperature≥100° C.

In the method of preparing metal hydrides by high-temperature molten salt electrolysis in humid atmosphere, the temperature of the molten salt is greater than or equal to the melting temperature of the molten salt+1° C.

In the method of preparing metal hydrides by high-temperature molten salt electrolysis in humid atmosphere, the heating rate of the molten salt is 0.1 to 100° C./min.

In the method of preparing metal hydrides by high-temperature molten salt electrolysis in humid atmosphere, the voltage of molten salt electrolysis is 0.7 to 3V.

The electrochemical method for high-temperature molten salt electrolysis in humid atmosphere includes a method for preparing hydrogen by high-temperature molten salt electrolysis in humid atmosphere, a method for preparing metals/alloys by high-temperature molten salt electrolysis in humid atmosphere, a method for preparing metal oxide compounds by high-temperature molten salt electrolysis in humid atmosphere, and a method for preparing metal hydrides by high-temperature molten salt electrolysis in humid atmosphere, the product of which contains one or more of metal compounds TiAl, $Ti_3Al$, NiAl, $TiAl_3$, $NiAl_3$, NbAl, $Nb_3Al$, FeAl, $Fe_3Al$, and CoAl.

The invention relates to an electrochemical device for high-temperature molten salt electrolysis in humid atmosphere, a molten salt reactor for preparing hydrogen and a water vapor supply device; the water vapor supply device comprises a water vapor inlet device and a gas outlet device; the water vapor inlet part is connected to the molten salt reactor that prepares hydrogen, and the gas outlet part is connected to the molten salt reactor that prepares hydrogen.

The molten salt reactor for preparing hydrogen is a closed device.

The molten salt reactor for preparing hydrogen comprises a retort made of stainless steel or Inconel alloy.

The molten salt reactor for preparing hydrogen is provided with a quartz protective sleeve and a quartz cover, which are used to prevent the corrosion of the stainless steel retort by the high-temperature molten salt.

The working cathode of the molten salt reactor for preparing hydrogen is molybdenum, tungsten or ceramic materials.

The molybdenum working cathode or the tungsten working cathode has a mesh shape.

The ceramic material is $LiTiO_2$.

There are two types of water vapor supply devices:

According to the first kind of water vapor supply device, the water vapor inlet device comprises an inert gas supply device, a water-holding container, and a gas guide tube. The inert gas supply device is connected to the water-holding container through a gas guide tube. The water-holding container is connected to the molten salt reactor that prepares hydrogen through a gas guide tube; the gas outlet device is a gas outlet pipe, and the outlet pipe is connected to the molten salt reactor that prepares hydrogen.

The water-holding container is a closed container.

The above-mentioned first type of water vapor supply device introduces water vapor into the molten salt reactor for preparing hydrogen through an inert gas.

In the second type of water vapor supply device, the water vapor inlet device is a steam generation device, and the gas outlet device is a chiller, and the chiller is provided with a water vapor liquefaction conduit and a gas outlet.

As disclosed within Figures, 1 is molten salt reactor for preparing hydrogen, 2 is quartz protective sleeve, 3 is graphite crucible, 4 is molten salt electrolyte, 5 is working cathode, 6 is cathode lead rod, 7 is inert gas bottle, 8 is gas guide pipe, 9 is container, 10 is water, 11 is anode lead rod, 12 is steam generating device, 13 is gas inlet, 14 is separator duct, 15 is chiller, 16 is water outlet, 17 is hydrogen, and 18 is quartz cover.

DETAILED DESCRIPTION

The characterization and analysis equipment used comprised of X-ray diffractometer (XRD, MPDDY2094, copper target, wavelength 1.5405 Å, Panakko, Netherlands), scanning electron microscope (SEM, Ultra Plus, Zeiss, Germany) equipped with energy dispersive spectrometer (EDS, Shimadzu Corporation), and infrared carbon sulfur analyzer (CS230, American LECO company). The electrolysis experiments were conducted using a constant voltage and constant current power supply (IT6502D, ITECH), and the current-time relationship during the electrolysis process was recorded. A molybdenum wire was used as the reference electrode, and the anodic potential and cathodic potential during the electrolysis process were recorded by a multimeter (Keysight 34460A). A hydrogen sensor was used to monitor and record the hydrogen concentration of the escaping gas during the electrolysis experiment.

Figure 1:
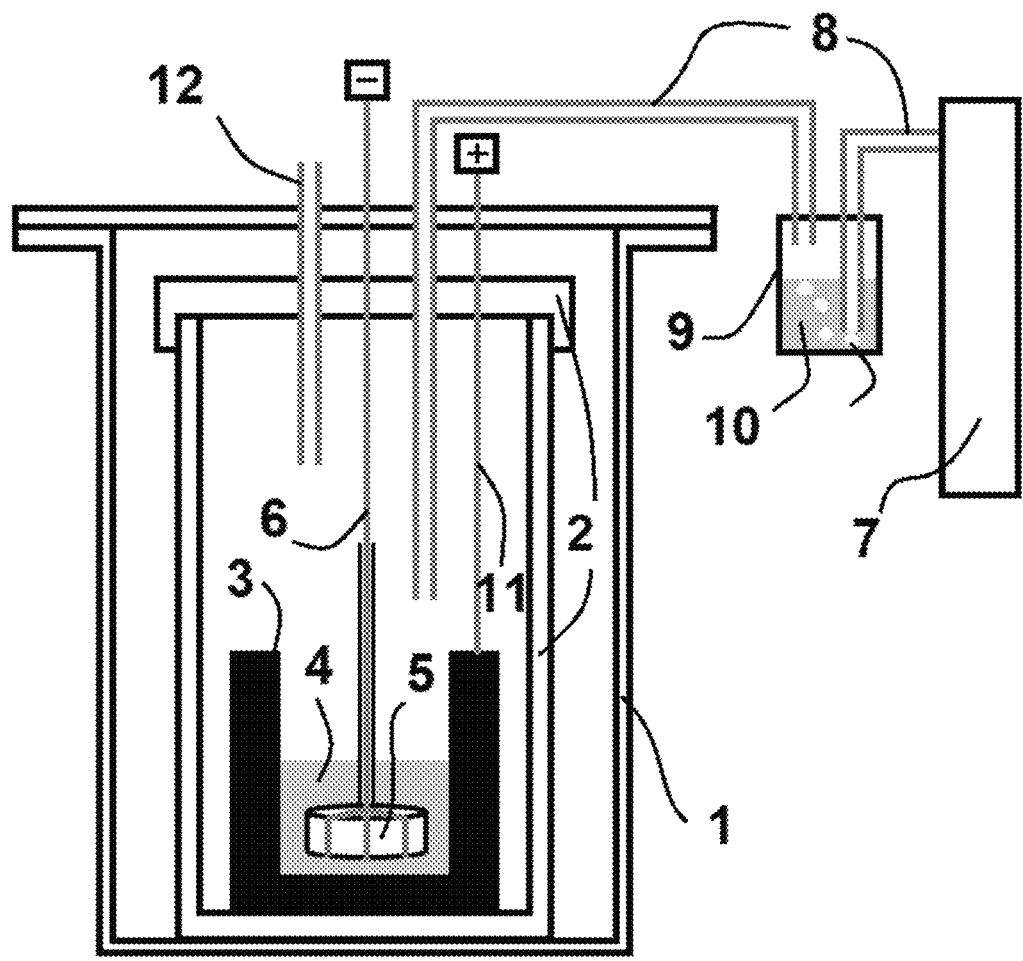
FIG. 1 shows the electrochemical device for high-temperature molten salt electrolysis in humid atmosphere used in Examples 1 to 3 of the present invention.

The electrochemical device for high-temperature molten salt electrolysis in humid atmosphere, explained in Examples 1 to 3, is used for the preparation of metals/alloys/metal oxide compounds/metal hydrides. As shown in FIG. 1, the molten salt reactor for preparing hydrogen 1 comprises a retort made of stainless steel or Inconel alloy. The retort has a quartz protective sleeve 2 and a quartz cover 18 to prevent corrosion of the stainless steel retort by high-temperature molten salt; at the bottom of the quartz sleeve, there is a graphite crucible 3 used as the electrolysis reaction vessel, the crucible contains molten salt electrolyte 4, such as LiCl, $CaCl_2$, $MgCl_2$ and NaCl, or a mixed molten salt thereof; metal oxide is inserted into the molten salt electrolyte and used as the working cathode 5, the working cathode 5 can be made of metal oxide powder which is compression molded and sintered at a suitable temperature to make the working cathode 5 with suitable structural strength. The working cathode 5 is wound around one end of the cathode lead rod 6 using a high-melting metallic wire and the cathode lead rod 6 is sheathed by an alumina ceramic protection tube. During the electrolysis process, the water is brought into the reactor through an inert gas (argon or nitrogen); the gas in the inert gas bottle 7 flows into the container 9 containing deionized water through the gas guide pipe 8, and then the humidified gas flows into the molten salt reactor for preparing hydrogen 1. The container 9 may be made of glass, and the water vapor brought into the reactor can be dissolved in the molten salt 4, and the molten salt is hydrolysed to generate hydrogen ions; 11 is a metal lead rod connected to the graphite crucible. During the electrolysis process, the cathode lead rod 6 is connected to the negative pole of the power supply; the anode lead rod 11 is connected to the positive pole of the power supply, and 12 is the outlet pipe for the protective gas in the reactor.

Figure 2:
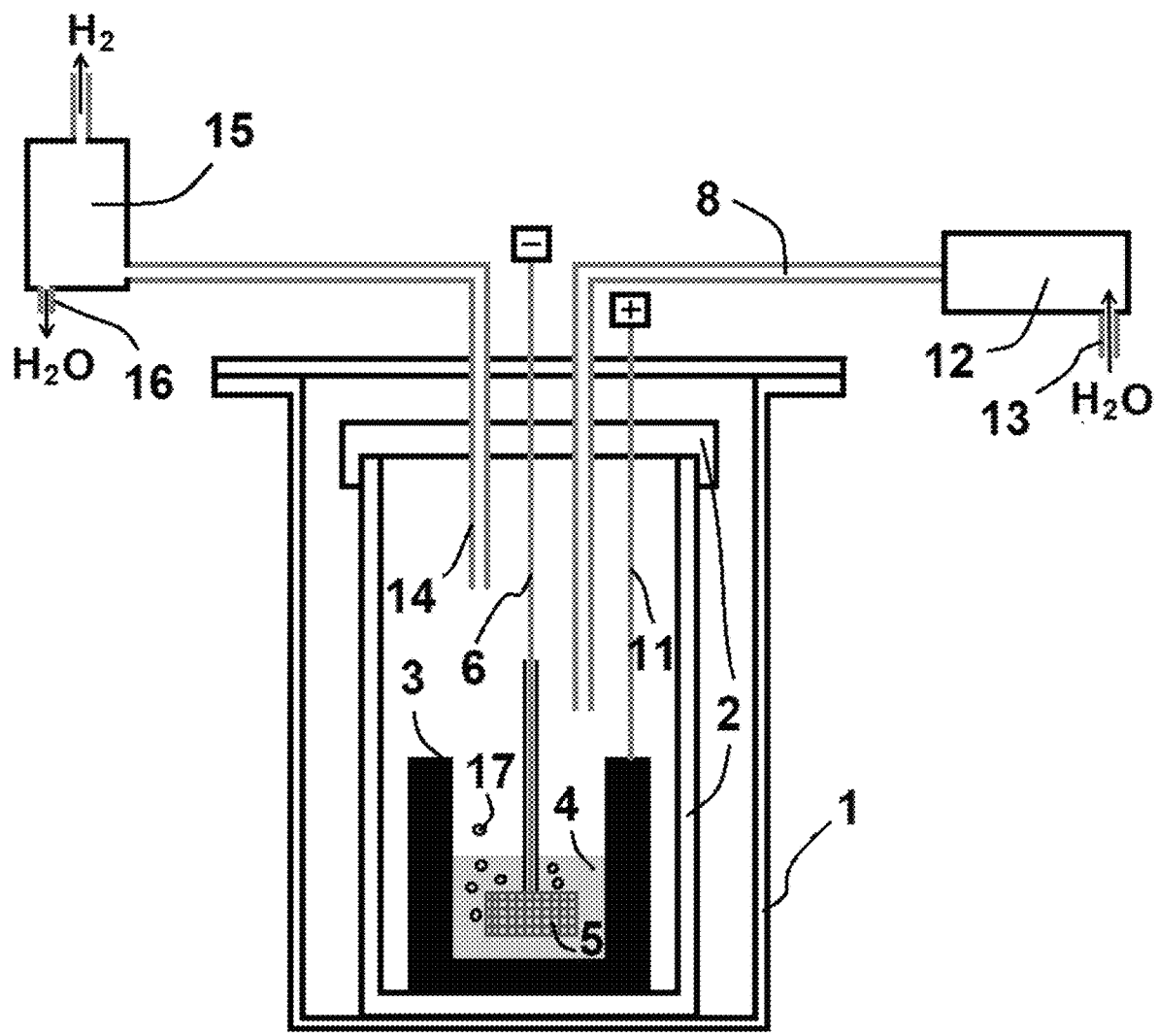
FIG. 2 shows the electrochemical device for high-temperature molten salt electrolysis in humid atmosphere used in Examples 4 to 6 of the present invention.

According to Examples 4 to 6, the electrochemical device for high-temperature molten salt electrolysis in humid atmosphere is used to prepare metals/alloys/metal oxide compounds/metal hydrides. As shown in FIG. 2, the molten salt reactor for preparing hydrogen comprises of a retort made of stainless steel or Inconel alloy. The molten salt reactor for preparing hydrogen 1 can be sealed; the molten salt reactor for preparing hydrogen 1 has a quartz protective sleeve 2 and a quartz cover 18 to prevent the corrosion of the stainless steel retort from high-temperature molten salt. The graphite crucible 3 which is a container for the electrolysis reaction is located at the bottom of the quartz casing. The graphite crucible is filled with molten salt electrolyte 4, such as LiCl, $CaCl_2$, $MgCl_2$ and NaCl, or their mixed molten salts. Before the start of the electrolysis process, the temperature is raised to a certain temperature according to the established procedure, so that the molten salt is completely melted. A working electrode 5 made of metallic molybdenum or tungsten with mesh shape is located inside the graphite crucible. Working cathodes can also be made of ceramic materials, such as $LiTiO_2$, which have a certain conductivity and sufficient thermal shock resistance. The working cathode is connected to the cathode lead rod 6. During the electrolysis process, the steam generating device 12 continuously injects water vapor through the gas guide pipe 8 into the reactor. The water vapor brought into the reactor can dissolve in the molten salt electrolyte 4, and the molten salt is hydrolysed to form hydrogen ions. 11 is a metallic anode lead rod connected to the graphite crucible. During the electrolysis process, the cathode lead rod 6 is connected to the negative pole of a power supply, and the anode lead rod 11 is connected to the positive pole of the power supply. Under a cathode polarization potential, hydrogen ions dissolved in molten salt are discharged at the cathode to produce hydrogen. The hydrogen/water vapor mixture generated by the electrolytic process escapes the reactor through the separator duct 14, entering chiller 15. At a temperature below 25° C., the water vapor in the mixture is liquefied and collected by the outlet pipe 16, and then recycled. The hydrogen escaped from the process is dried, collected and stored.

Example 1

Presented is a method of preparing metal oxide by high temperature molten salt electrolysis in humid atmosphere, using the electrochemical device shown FIG. 1, in which a pressed porous iron oxide pellet (20 mm in diameter and 3 mm in thickness) is the working cathode, and the pellet is wrapped and fixed on a copper lead rod (800 mm in length and 6 mm in diameter, covered by a corundum protection tube) using nickel wire. A high-purity graphite crucible (55 mm in inner diameter 55 mm, 15 mm in wall thickness, and 140 mm in height) containing 250 g anhydrous LiCl is used. A molybdenum wire with the diameter of 1 mm and length of 800 mm is employed as the reference electrode.

The electrolytic cell is heated to 660° C. at a heating rate of 5° C. per minute, the electrolysis temperature is higher than the melting point of LiCl molten salt by about 50° C., and the water vapor content of the molten salt protective atmosphere is 0.75 Vol. %. The electrolysis voltage is 1V and the electrolysis time is 1 h. During the electrolysis process, the flow rate of argon gas into the electrolysis cell was 600 mL/min. A U-shaped quartz tube was filled with deionized water. After the argon gas flowed through the U-shaped quartz tube, the humid argon gas flowed into the sealed reactor. After the electrolysis experiment is completed, and cooling down to room temperature, the salt present in the graphite crucible was washed with deionized water, and the cathode pellet was eventually retrieved. The separated cathode pellet was thoroughly washed with deionized water to remove residual salt and dried in a vacuum drying oven.

Figure 3:
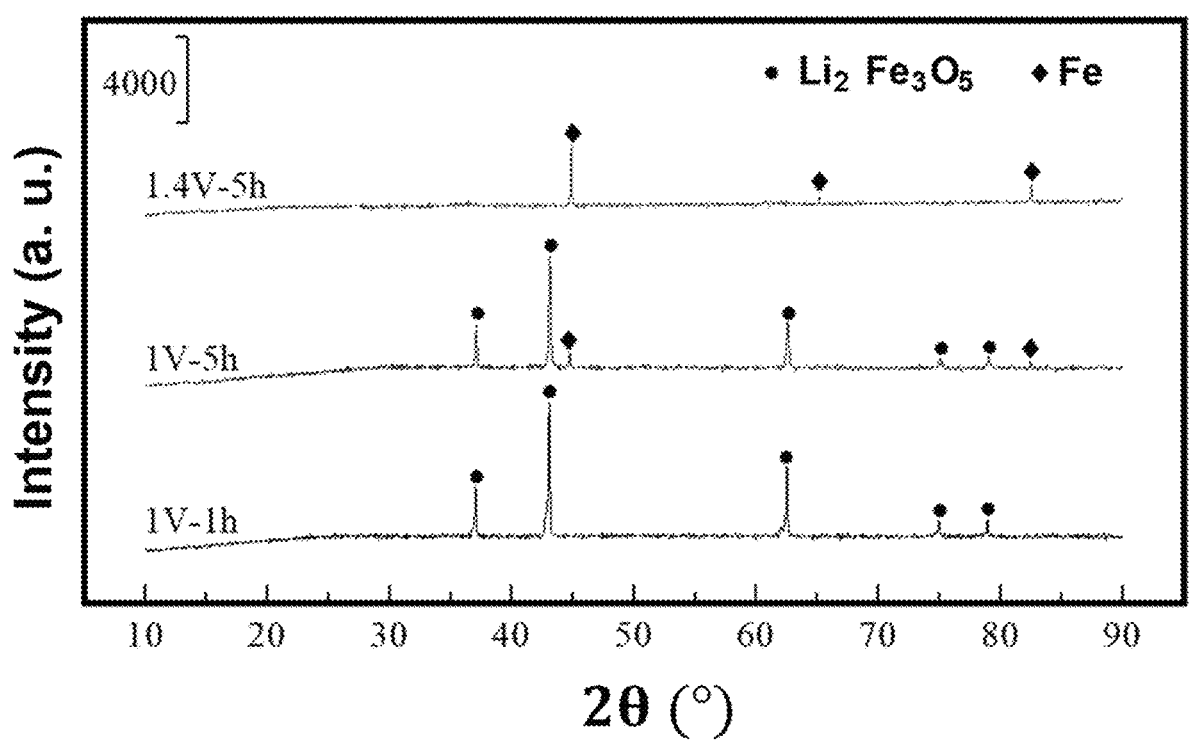
FIG. 3 shows XRD patterns of the products prepared in Examples 1 to 3 of the present invention.
Figure 4:
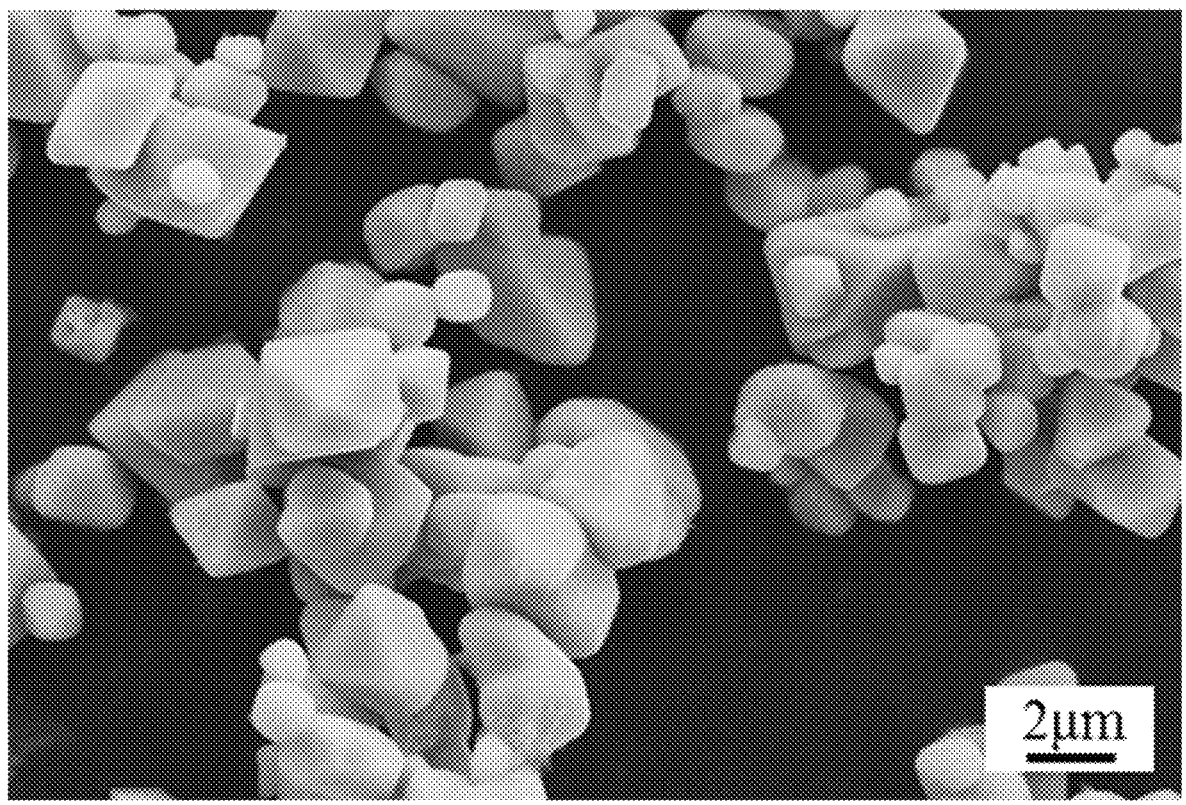
FIG. 4 shows the scanning electron micrograph of the prepared metal oxide compound prepared in Example 1 of the present invention.

The XRD pattern of the product is shown in FIG. 3. After electrolysis at 1V for 1 h, the phase composition of the product is $Li_2Fe_3O_5$. The SEM micrograph of the product (FIG. 4) shows that the micro-morphology of the product obtained is in the form of uniform octahedral structures with a particle size of 1 to 5 μm.

Example 2

Presented is a method of preparing metals by high temperature molten salt electrolysis in humid atmosphere, according to the electrochemical device and parameter conditions described in Example 1, with the exception that the electrolysis time is 5 h and the water vapor content in the molten salt protective atmosphere is 0.8 Vol. %. The XRD pattern of the product is shown in FIG. 3. As can be seen from FIG. 3, the phase composition of the product consists of $Li_2Fe_3O_5$ and Fe. The diffraction peaks at 2θ=44.7° and 82.4° correspond to the metallic iron phase. The results show that iron oxide can be reduced to metallic iron at a voltage lower than its theoretical decomposition voltage.

Example 3

Figure 5:
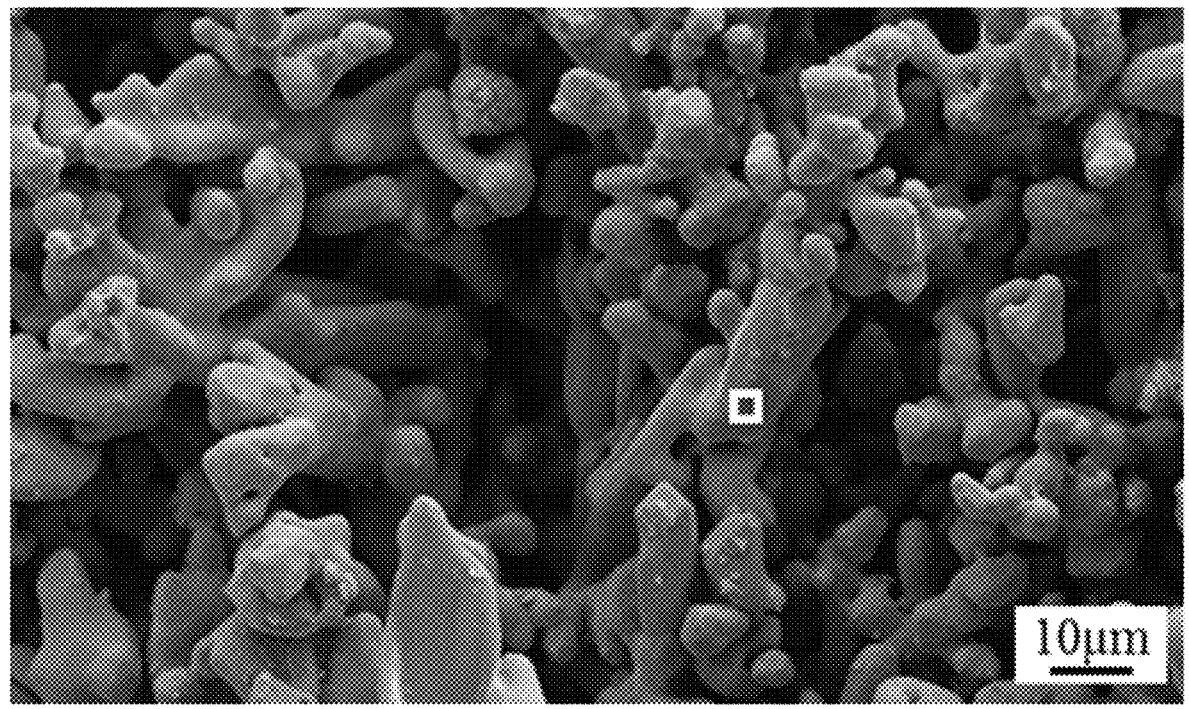
FIG. 5 shows the scanning electron micrograph and EDX spectrum of the metal oxide compound prepared in Example 3 of the present invention.
Figure 5:
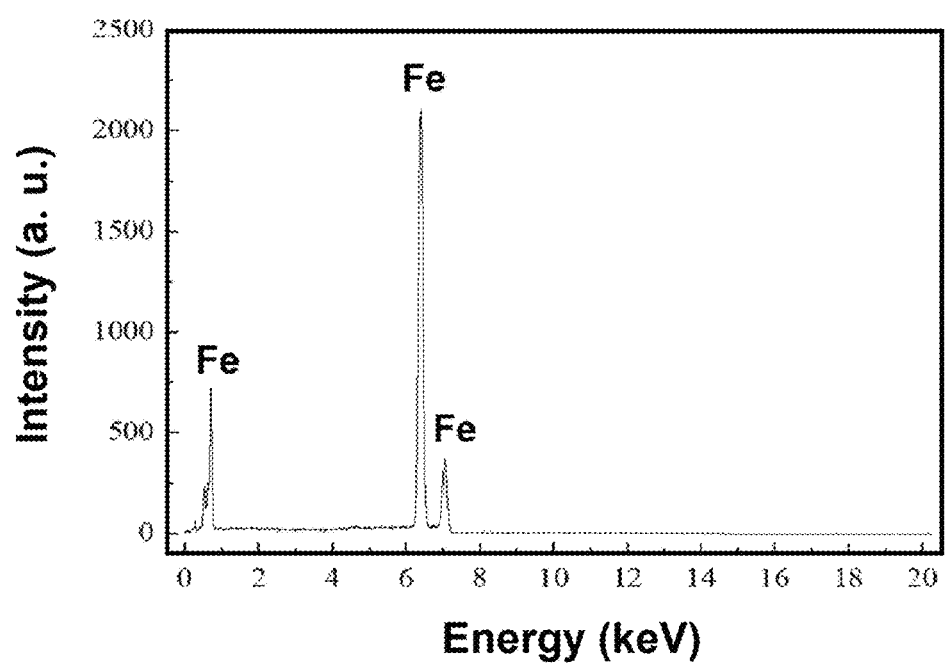

Presented is a method of preparing metals by high temperature molten salt electrolysis in humid atmosphere, according to the electrochemical device described in Example 1, with the exception that the electrolysis voltage is 1.4 V, the electrolysis time is 5 h, and the water vapor content of the molten salt protective atmosphere is 1.0 Vol. %. The XRD pattern of the product is shown in FIG. 3. From the XRD analysis results presented in FIG. 3, it can be seen that the product obtained by the electrolysis process is metallic iron. The scanning electron micrograph and the EDX energy spectrum of the product are shown in FIG. 5. The EDX energy spectrum result corresponds to the white square marked area in the scanning electron micrograph. The SEM and EDS results further show that the iron oxide is completely reduced to metallic iron, and the particle size of the product does not exceed 10 μm. The carbon content of the electrolytic product is about 0.3 wt %.

Example 4

Presented is a method of producing hydrogen by high temperature molten salt electrolysis in humid atmosphere using the electrochemical device shown in FIG. 2, in which the molten salt electrolyte is LiCl, the electrolysis temperature is 650° C., and the water vapor content of the molten salt protective atmosphere is 0.75 Vol. %. The working cathode is an iron rod, and the electrolysis voltage is 0.9V. The gas product obtained by electrolysis is hydrogen, which is detected by a hydrogen sensor.

Example 5

Presented is a method of producing hydrogen by high temperature molten salt electrolysis in humid atmosphere using the electrochemical device shown in FIG. 2, in which the molten salt electrolyte is LiCl, the electrolysis temperature is 650° C., and the water vapor content of the molten salt protective atmosphere is 0.8 Vol. %. The working cathode is tungsten mesh, the electrolysis voltage is 1V, and the gas product obtained by electrolysis is hydrogen, which is detected by a hydrogen sensor.

Example 6

Presented is a method of producing hydrogen by high temperature molten salt electrolysis in humid atmosphere using the electrochemical device shown in FIG. 2, in which, the molten salt electrolyte is LiCl, the electrolysis temperature is 650° C., and the water vapor content of the molten salt protective atmosphere is 0.9 Vol. %. The working cathode is nickel mesh, and the electrolysis voltage is 1.4 V. The gas product obtained by the electrolysis process is hydrogen, which is detected by a hydrogen sensor.

Example 7

Presented is a method of producing hydrogen by high temperature molten salt electrolysis in humid atmosphere using the electrochemical device shown in FIG. 2, in which the molten salt electrolyte is LiCl, the electrolysis temperature is 650° C., and the water vapor content of the molten salt protective atmosphere is 1.0 Vol. %. The working cathode is a $LiTiO_2$ ceramic pellet, and the electrolysis voltage is 2V. The gas product obtained by the electrolysis process is hydrogen, which is detected by a hydrogen sensor.

Example 8

Figure 6:
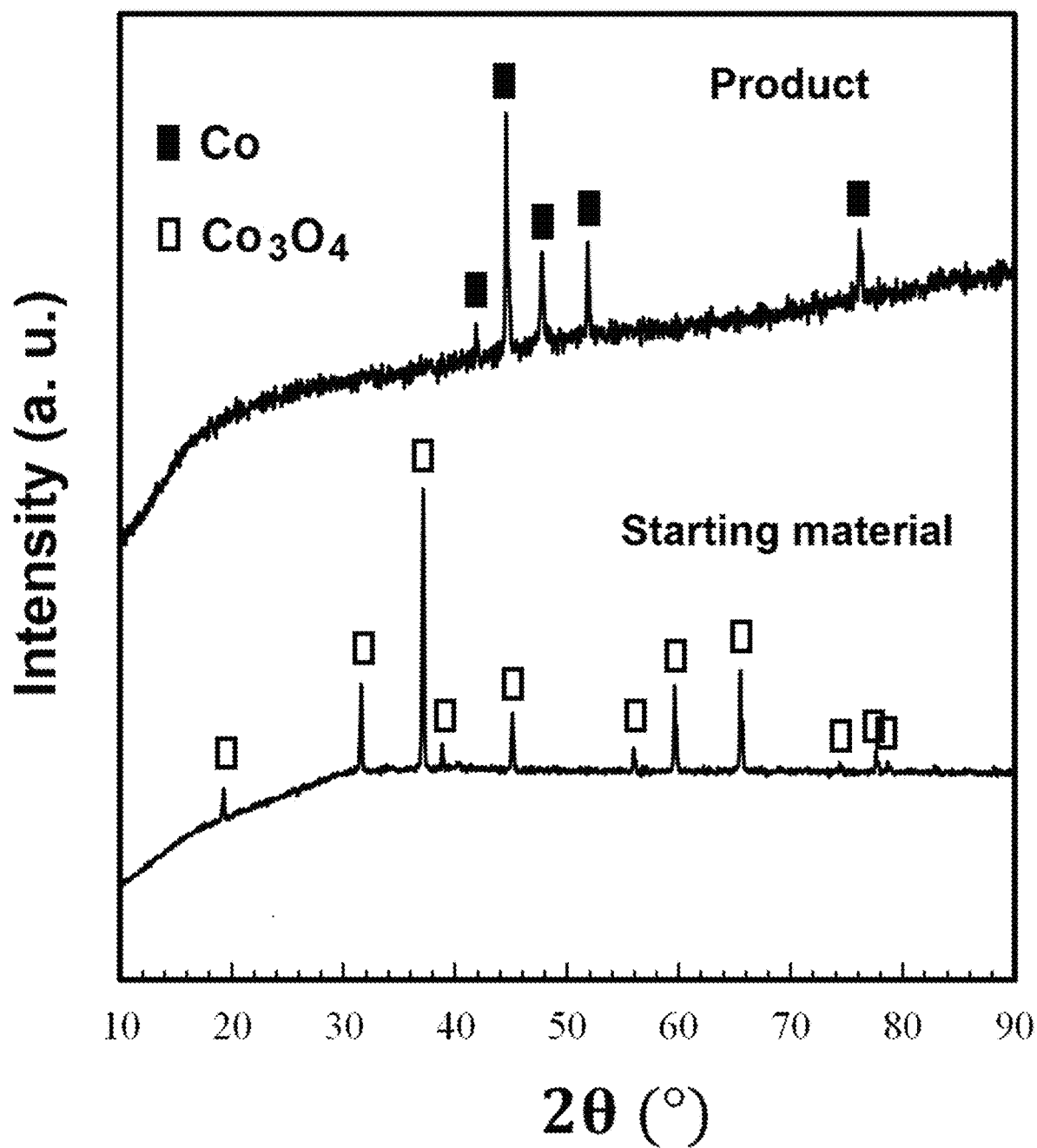
FIG. 6 shows XRD patterns of the initial materials and products prepared in Example 8 of the present invention.

Presented is a method of preparing metals by high-temperature molten salt electrolysis in humid atmosphere. The high-temperature molten salt electrolysis method for preparing a high-temperature molten salt humid atmosphere uses the electrochemical device of Example 1, and the difference from Example 1 are that: the working cathode raw material is cobalt oxide ($Co_3O_4$), the electrolysis voltage is 0.97 V, the electrolysis time is 6 h, and the water vapor content in the molten salt protection atmosphere is 1.0 Vol. %. The XRD pattern of the initial material and the product are shown in FIG. 6. As can be seen from the XRD analysis of FIG. 6, the electrolytic product is metallic cobalt phase.

Example 9

Presented is a method of preparing metals by high-temperature molten salt electrolysis in humid atmosphere, in which the humid atmosphere of high-temperature molten salt is prepared by high-temperature molten salt electrolysis method using the electrochemical device explained in Example 1. Differences with Example 1 are: the working cathode material is nickel oxide (NiO), the electrolytic voltage is 0.97 V, the electrolytic time is 6 h, and the water vapor content in the molten salt protection atmosphere is 1.0 Vol. %. The XRD pattern of the product identified the electrolytic product to be metallic nickel phase.

Example 10

Figure 7:
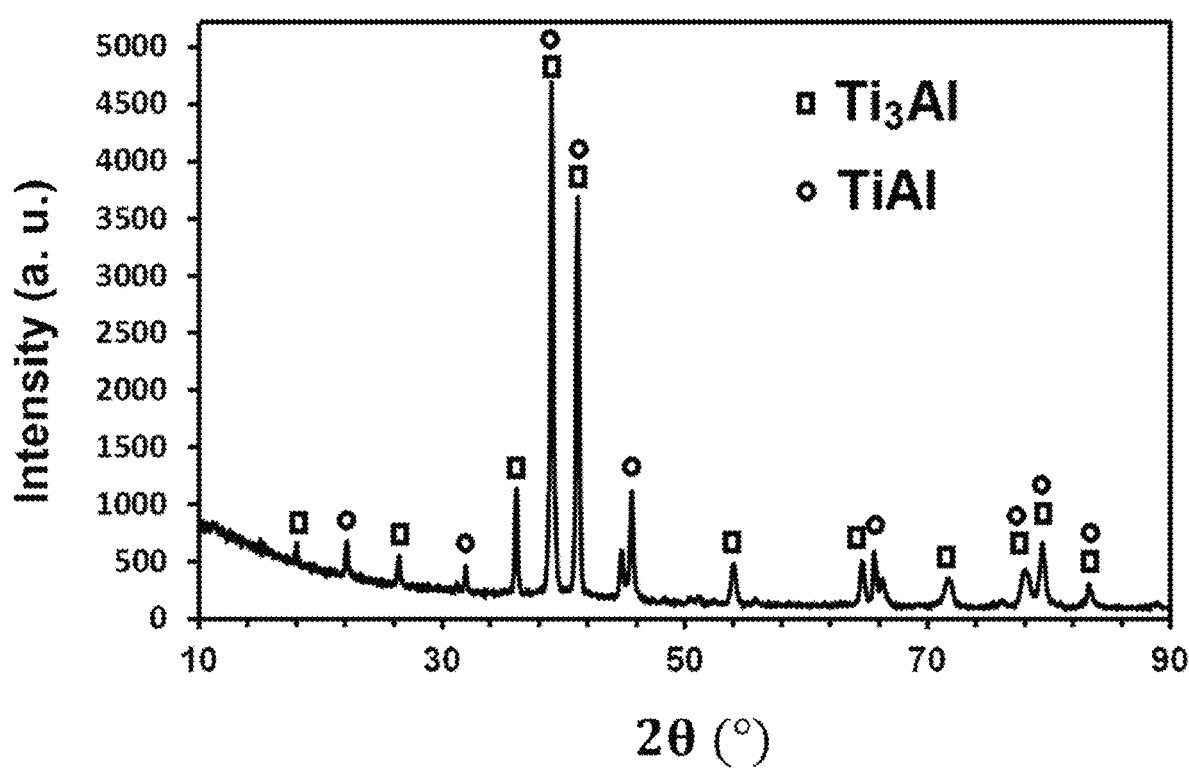
FIG. 7 shows the XRD analysis of the product produced in Example 10 of the present invention.

Presented is a method of preparing metals by high-temperature molten salt electrolysis in humid atmosphere, in which the humid atmosphere of high-temperature molten salt is prepared by high-temperature molten salt electrolysis method using the electrochemical device explained in Example 1. Differences with Example 1 are: the raw material (5) is a mixture of $TiO_2$ (75 wt %) and $Al_2O_3$ (25 wt %), the electrolysis voltage is 2.8V, the electrolysis time is 9 h, the water vapor content in the molten salt protection atmosphere is 2 Vol. %, and the working temperature is 770° C. FIG. 7 shows the XRD pattern of the product. As can be seen, the product is a mixture of intermetallic phases $Ti_3Al$ and TiAl.

Example 11

Presented is a method of preparing metals by high-temperature molten salt electrolysis in humid atmosphere, in which the humid atmosphere of high-temperature molten salt is prepared by high-temperature molten salt electrolysis method using the electrochemical device explained in Example 1. Differences with Example 1 are: the raw material (5) is $TiO_2$, the electrolysis voltage is 2.8V, the electrolysis time is 15 h, the water vapor content of the molten salt atmosphere is 2 Vol. %, the molten salt is LiCl-10 wt % KCl, and the operating temperature is 770° C. The product was metallic titanium.

The invention claimed is:

1. A method of producing hydrogen by high-temperature molten salt electrolysis in humid atmosphere, wherein the method is conducted in a humid molten salt electrolysis environment, and the hydrogen is produced by the molten salt electrolysis; where the temperature of the molten salt is 150 to 1000° C., the water vapor content of a molten salt protective atmosphere is 0.1 to 100 Vol. %, and a molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaF_2$ and $ZnCl_2$.

2. The method of producing hydrogen by high-temperature molten salt electrolysis in humid atmosphere according to claim 1, wherein in the method of producing hydrogen by high-temperature molten salts in humid atmosphere, during the molten salt electrolysis, the molten salt electrolyte contains HCl, HF or HI; and the voltage of the molten salt electrolysis is 0.7 to 3V.

3. The electrochemical method of high-temperature molten salt electrolysis in humid atmosphere according to claim 1, wherein the product prepared by the method contains one or more of metallic compounds TiAl, $Ti_3Al$, NiAl, $TiAl_3$, $NiAl_3$, NbAl, $Nb_3Al$, FeAl, $Fe_3Al$ and CoAl.

4. The method according to claim 1, wherein in the humid molten salt electrolysis environment, solid metals are used as the cathode, and the metals are hydrogenated by the hydrogen generated by the molten salt electrolysis, and the corresponding metal hydrides are produced.

5. A method for producing metals/alloys by high-temperature molten salt electrolysis in humid atmosphere, wherein the method is carried out in a humid molten salt electrolysis environment, solid metal oxide cathodes are reduced in-situ by hydrogen generated through the electrolysis in a molten salt, the metal oxides are used as working cathodes during the electrolysis, and the metals/alloys are produced; and the temperature of the molten salt is 150 to 1000° C., the water vapor content of a protective atmosphere of the molten salt is 0.1 to 100 Vol. %, and a molten salt electrolyte is a mixture of one or more components of alkali metal halides and/or alkaline earth metal halides.

6. The method for producing metals/alloys by high-temperature molten salt electrolysis in humid atmosphere according to claim 5, wherein the metal oxide is a working cathode.

7. The method for producing metals/alloys by high-temperature molten salt electrolysis in humid atmosphere according to claim 5, wherein the metal oxide is placed in the molten salt electrolyte, the molten salt electrolyte dissolves hydrogen ions, and the temperature of the molten salt is 150 to 1000° C.

8. The method for producing metals/alloys by high-temperature molten salt electrolysis in humid atmosphere according to claim 5, wherein in the method for producing metals/alloys by high-temperature molten salts in humid atmosphere, the molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaF_2$ and $ZnCl_2$.

9. The method for producing metals/alloys by high-temperature molten salt electrolysis in humid atmosphere according to claim 8, wherein the molten salt electrolyte is LiCl.

10. The method for producing metals/alloys by high-temperature molten salt electrolysis in humid atmosphere according to claim 5, wherein the metal oxide is one or a mixture containing at least one of $MoO_3$, $WO_3$, PbO, CuO, ZnO, $SnO_2$, $V_2O_3$, $Cr_2O_3$, CoO, NiO or $Mn_2O_3$.

11. The method for producing metals/alloys by high-temperature molten salt electrolysis in humid atmosphere according to claim 10, wherein the electrolysis product is $Li_2Fe_3O_5$.

12. The method for producing metals/alloys by high-temperature molten salt electrolysis in humid atmosphere according to claim 10, wherein the voltage of the molten salt electrolysis is ≤2V.

13. The method for producing metals/alloys by high-temperature molten salt electrolysis in humid atmosphere according to claim 5, wherein the metal oxide is one or a mixture containing at least one of $TiO_2$, $ZrO_2$, $UO_2$, $SiO_2$, or $Nb_2O_5$.

14. The method for producing metals/alloys by high-temperature molten salt electrolysis in humid atmosphere according to claim 13, wherein the voltage of the molten salt electrolysis is ≤3V.

15. The method for producing metals/alloys by high-temperature molten salt electrolysis in humid atmosphere according to claim 5, wherein the voltage of the molten salt electrolysis is 1 V, the metal oxide is $Fe_2O_3$ and the electrolysis product is metallic iron.

16. The method for producing metals/alloys by high-temperature molten salt electrolysis in humid atmosphere according to claim 5, wherein during the molten salt electrolysis, the molten salt electrolyte contains HCl, HF or HI.

17. The method for producing metals/alloys by high-temperature molten salt electrolysis in humid atmosphere according to claim 5, wherein hydrogen ions in the molten salt electrolyte are derived from hydrolysis reaction of the molten salt under the humid atmosphere.

18. The method for producing metals/alloys by high-temperature molten salt electrolysis in humid atmosphere according to claim 5, wherein the temperature of the water vapor brought into the molten salt electrolysis reactor is ≥100° C.

19. The method for producing metals/alloys by high-temperature molten salt electrolysis in humid atmosphere according to claim 5, wherein the temperature of the molten salt is greater than or equal to the melting temperature of the molten salt+1° C.; and the heating rate of the molten salt is 0.1 to 100° C./min.

20. The method for producing metals/alloys by high-temperature molten salt electrolysis in humid atmosphere according to claim 5, wherein the molten salt electrolysis voltage is 0.7 to 3 V.

21. A method of producing metal oxide compounds by high-temperature molten salt electrolysis in humid atmosphere, wherein the method is carried out in a humid molten salt electrolysis environment, solid metal oxide cathodes are reduced in-situ by hydrogen generated through electrolysis in the molten salt, during the electrolysis, the metal oxides are used as working cathodes, and corresponding metal oxide compounds are prepared; and the temperature of the molten salt is 150 to 1000° C., the water vapor content of a protective atmosphere of the molten salt is 0.1 to 100 Vol. %, and the molten salt electrolyte is one or more of LiF, LiCl, LiBr, LiI, NaF, NaCl, NaBr, NaI, KF, KCl, KBr, KI, RbF, RbCl, RbBr, RbI, CsF, CsCl, CsBr, CsI, $MgCl_2$, $MgF_2$, $CaCl_2$, $CaF_2$, $SrCl_2$, $SrF_2$, $BaCl_2$, $BaF_2$ and $ZnCl_2$.

22. The method of producing metal oxide compounds by high-temperature molten salt electrolysis in humid atmosphere according to claim 21, wherein in the method of producing metal oxide compounds by high-temperature molten salts in humid atmosphere, the metal oxide is one or a mixture containing at least one of $MoO_3$, $WO_3$, PbO, CuO, ZnO, $SnO_2$, $V_2O_3$, $Cr_2O_3$, CoO, NiO, $Mn_2O_3$, $TiO_2$, $ZrO_2$, $UO_2$, $SiO_2$ or $Nb_2O_5$; and the metal oxide is the working cathode and a certain cathode polarization potential is applied.

23. The method of producing metal oxide compounds by high-temperature molten salt electrolysis in humid atmosphere according to claim 21, wherein during the molten salt electrolysis, the molten salt electrolyte contains HCl, HF or HI.

24. The method of producing metal oxide compounds by high-temperature molten salt electrolysis in humid atmosphere according to claim 21, wherein the molten salt electrolysis voltage is 0.7 to 3 V.

* * * * *